United States Patent Office 3,631,131
Patented Dec. 28, 1971

3,631,131
METHOD OF RECONSTITUTING UNFIRED, CAST, ALUMINA SCRAP
Paul Kopko, Anderson, Ind., assignor to
RCA Corporation
No Drawing. Filed May 4, 1970, Ser. No. 34,599
Int. Cl. C08f 47/24
U.S. Cl. 260—2.3        11 Claims

ABSTRACT OF THE DISCLOSURE

Unfired, cast, alumina scrap, comprising components of aluminum oxide, inorganic additives, a plasticizer, and a binder, is reconstituted into a slip suitable for recasting by first milling a charge of the scrap with an excess of solvent for the binder in a slip ball mill. The scrap is milled until the binder dissolves and the scrap is broken down into its components. Then, an additional charge, comprising components similar in chemical composition to those in the broken-down scrap, is added to the contents of the slip ball mill in a quantity to provide at least 25%, by weight, of a total charge for the slip mill. The total charge is milled with the aforementioned excess of solvent to provide the recasting slip wtih a viscosity of between 20,000 and 35,000 centipoises.

BACKGROUND OF THE INVENTION

This invention relates to a method of reconstituting unfired, cast, alumina scrap. The novel method is useful for reconstituting "green" (unfired) alumina-substrate scrap formed in the manufacture of insulating substrates for thick-film circuitry in the electronic arts.

Fired alumina sheets, comprising at least 75% aluminum oxide, are used as substrates for thick-film circuit applications in the electronic arts because they possess very desirable characteristics of thermal conductivity, electrical insulation, and mechanical strength. The alumina substrate is formed by milling a charge of powdered aluminum oxide, inorganic additives, a binder, and a plasticizer in a solvent for the binder to form a slip whose consistency is somewhat like that of a thick syrup. The slip is cast by spreading it in a layer, as with a doctor blade, on a smooth moving belt. The slip is dried by evaporating the solvent therefrom, and the resulting cast substrate is removed from the belt. This unfired cast substrate is known as green ceramic, or green alumina substrate.

When the green alumina substrate is fired, it shrinks, its density increases, and it forms the fired alumina substrate that is so well suited for the aforementioned thick-film applications. This shrinkage may be as high as 25% or as low as 10%, depending on the density of the components in the charge, among other factors. Therefore, the green alumina substrate must enter the firing kiln with a definite known correction for shrinkage if proper, desired, fired dimensions are to be obtained. Compensation, after firing, for non-uniform shrinkage is neither practical nor profitable.

Since the green alumina substrate is relatively much softer than the fired substrate, the machining operations of cutting, punching, and hole drilling are performed on the green alumina substrate before the firing operation. These machining operations, along with defectively cast alumina substrates, provide a relatively large amount of alumina, unfired, cast, alumina-substrate scrap which, unless reclaimed, may represent a considerable financial waste.

It has been proposed to break the unfired, cast alumina-substrate scrap down into its components by dry milling it into a powder and then adding a charge of the resulting powder scrap and a solvent for the binder to the slip mill, either alone or with an additional charge of virgin (not scrap) powder, to form the slip for recasting. This procedure, however, produced a slip that formed a green alumina-substrate cast, which, when fired under standardized conditions, produced an unpredictable amount of shrinkage. The shrinkage varied unpredictably with the quantity of scrap in the total charge in the slip mill, as well as with the density of the dry-milled, green, cast scrap.

The novel method of reconstituting unfired, cast, alumina-substrate scrap provides a slip which, when cast and fired, produces an alumina-substrate of predictable uniform shrinkage. The novel method obviates the uncertainties of the percentage of shrinkage in the prior-art method of reconstituting unfired alumina-substrate scrap.

SUMMARY OF THE INVENTION

The novel method of reconstituting unfired, cast, alumina scrap, comprising components of aluminum oxide and a binder, into slip for recasting comprises milling a charge of the scrap with an excess of solvent for the binder in a slip mill until the binder dissolves and the scrap is broken down into its components. An additional virgin charge, comprising virgin components equivalent in chemical composition to those in the broken-down scrap, and in the same ratio as in the scrap, is added to the contents of the slip mill to provide a total charge for the slip mill. The added additional virgin charge, which should comprise at least 25% of the total charge, is then milled to provide the slip for recasting.

The terms "alumina scrap" and "alumina substrate," as used herein, designate ceramic materials that comprise aluminum oxide as the major component by weight.

DESCRIPTION OF THE PREFERRED EMBODIMENTS

The novel method will be described in conjunction with the reconstituting of unfired, cast, alumina-substrate scrap of a type used in the manufacture of thick-film electronic circuits for the radio and television arts.

Formula 1

An example of an alumina substrate for the aforementioned purpose is made as follows: A virgin powder charge of aluminum oxide, inorganic additives, and a binder, are dry milled in a ball mill to provide powder particles whose average size is about 2.5 microns. A typical virgin powder charge, in percentage by weight, is as follows:

| | Percent |
|---|---|
| $Al_2O_3$ | 76.9 |
| $SiO_2$ | 7.7 |
| $MgCO_3$ | 8.1 |
| $CaCO_3$ | 3.6 |
| Binder (polyvinyl butyral, Butvar B-76, Monsanto Company) | 3.7 |
| | 100.0 |

After the dry milling, a charge of the virgin powder is weighed and added to a slip ball mill for milling with a solvent for the binder. A suitable solvent for the binder of polyvinyl butyral is trichlorethylene. About 10,200 cc. of the solvent trichlorethylene is added to 30,000 g. (1 cc. trichlorethylene to 2.94 g. of virgin powder) of the dry-milled virgin powder charge in the slip mill. A plasticizer, such as dibutyl phthalate, is also added to the slip mill in the amount of 216 cc. (1 cc. of dibutyl) phthalate for each 138 g. of virgin powder charge) to provide the green, cast substrate with a relatively flexible characteristic. The contents of the slip ball mill are milled for between two and six hours at an ambient temperature of between 68° F. and 76° F. to produce a thoroughly blended and mixed casting slip having a viscosity of between 20,000 and 35,000 centipoises. The function of the solvent is not only to dissolve the binder but also to provide a suitable vehicle, or carrier, for the solid material of the casting slip.

The slip is cast by spreading it on a moving belt, using a doctor blade to provide a cast in the form of a sheet, or substrate, of uniform thickness. The thickness of the cast alumina substrate is about 33 mils, for example. The moving belt on which the slip is cast is a smooth plastic material, such as "Mylar." The cast alumina substrate is dried by evaporating the solvent therefrom to form the green (unfired) alumina substrate.

Machining operations, such as cutting, drilling, and stamping, for example, are performed on the green alumina substrate, and the green alumina substrate is subsequently fired in a kiln at a temperature of about 1500° C. for about thirty hours. If the fired alumina substrate is made pursuant to controlled standardized conditions, the percentage of shrinkage is substantially constant, that is in the neighborhood of 16%. No more than 1% difference in shrinkage can be tolerated in view of subsequent operations to be performed upon the finished, fired, alumina substrate.

The amount of defective and non-usable, unfired, alumina substrate, that is, for example, substrate that is either too thick or too thin, or punched out portions of substrate produced by the machining operations result in scrap which can be reclaimed and reconstituted into a slip suitable for casting. The novel method of reconstituting the scrap alumina substrate provides a slip which, when cast and fired, produces an alumina substrate with a predictable shrinkage. The novel method, therefore, prevents an economic waste and makes possible a finished product at a lower cost than would otherwise be possible.

The novel method of reconstituting the unfired, cast, alumina-substrate scrap comprises the operation of first breaking a charge of the scrap down into its components. This charge may comprise up to about 75% of the weight of a total charge for the slip mill. Once broken-down into its components, by dissolving the binder which binds them together, an additional charge of virgin powder that has been previously dry milled to provide an average particle size of 2.5 microns, as described supra in Formula 1, is then added to the contents of the slip mill. Thus, the charge of scrap and the additional charge of virgin powder comprise the total charge for the solvent in the slip mill. The total charge is milled to provide a thoroughly blended and mixed slip for recasting. An important feature of the novel method is that the solvent used to break down the scrap into its components is originally present in the slip mill in a quantity sufficient not only to dissolve the binder in the charge of scrap but also to dissolve the binder in the additional virgin powder charge. The solvent should also have in solution a plasticizer in a quantity sufficient only for the additional virgin powder charge because the plasticizer originally in the scrap is one of the components recovered when the solvent dissolves the binder in the scrap. Hence, no additional plasticizer is necessary for the charge of scrap. The solvent and plasticizer are added initially to the slip ball mill in a quantity to provide the total charge in the slip mill with a viscosity of between 20,000 and 35,000 centipoises at between 68° F. and 76° F.

An example of the novel method of reconstituting a charge of alumina-substrate scrap into a slip for recasting is as follows: Let it be assumed that the charge of alumina-substrate scrap to be reconstituted weighs 5,000 g. Let it be assumed also that a total charge for a slip mill is 30,000 g. of particulate material. Hence, an additional virgin powder charge of 25,000 g. of dry-milled powder of the composition described supra in Formula 1 is used with the 5,000 g. charge of alumina-substrate scrap to provide a total charge for the slip mill. The term "total charge" as used herein, is not necessarily the total capacity of the slip mill. The ball slip mill is loaded with 10,200 cc. of the solvent, trichlorethylene, an amount (1 cc. for each 2.94 g. of total charge) of solvent determined previously to provide a slip consisting of a total charge of 30,000 g. of particulate material and 216 cc. of plasticizer, dibutyl phthalate, with a viscosity of between 20,000 and 35,000 centipoises at an ambient temperature of between 68° F. and 76° F. Next, 180 cc. of the plasticizer, dibutyl phthalate (1 cc. for each 138 g. of virgin powder), is added to the slip mill to provide a plasticizer only for the additional virgin charge of 25,000 g. of dry-milled virgin powder, the charge of 5,000 g. of alumina-substrate scrap already having the plasticizer as a recoverable component thereof. The charge of 5,000 g. of alumina-substrate scrap is added to the slip ball mill and milled in an ambient temperature of between 68° F. and 76° F. until the binder in the scrap dissolves and the scrap is broken down into its components. The time for this milling operation is between 5 and 15 minutes. The additional virgin charge of 25,000 g. of dry-milled virgin powder, having an average particle size of about 2.5 microns, is added to the contents of the ball slip mill and milled until the resulting slip is thoroughly mixed and blended. This milling time is between two and six hours in an ambient temperature of between 68° F. and 76° F. The milling time is determined by the time necessary to provide a thoroughly mixed and blend slip. Excessive milling should be avoided because too much heat may be generated which may adversely affect the organic materials in the ball slip mill. The resulting slip should have a viscosity of between 20,000 and 35,000 centipoises so that it can be cast into alumina substrates of a suitable thickness by the processes described supra. The viscosity of the slip should be checked and adjusted, if necessary, after the total charge has been milled for an hour or two.

I have observed that when the percentage of the charge of scrap, by weight, to the total charge for the solution of solvent and plasticizer in the slip mill is 75% or less, the alumina substrate cast from the resulting slip produced by the novel method provides a known predetermined percentage of shrinkage after it has been fired. While I have described the novel method in conjunction with the reconstitution of a particular unfired alumina-substrate scrap, the novel method is useful for reconstituting scrap from unfired alumina ceramics comprising between 75% and 99.5% aluminum oxide, by weight.

While substantially all green alumina substrates contain at least 75% aluminum oxide, they may also comprise inorganic additives, binders, and plasticizers other than those heretofore mentioned. For example, magnesium oxide, dolomite, and steatite may be used as inorganic additives; polyvinyl alcohol, methyl cellulose, and vinyl chloride-vinyl acetate copolymer may be used as binders; and phosphates, dibutyl sebacate, castor oil, and glycerine may be used as plasticizers. Also, another solvent, such as isopropanol or toluene, for example, may be substituted for the solvent used in the examples, supra, for dissolving the binder and for providing the casting slip with a desired viscosity.

What is claimed is:

1. A method of reconstituting unfired, cast, alumina scrap, comprising components of aluminum oxide and a binder, into a slip for recasting, said method comprising the steps of:

milling a charge of said scrap in a slip mill with a quantity of solvent in excess of that necessary to dissolve the binder in the total charge in said slip mill until said binder dissolves and said scrap is broken down into its components, adding an additional charge, comprising virgin components equivalent in chemical composition to those in the broken-down scrap and in the same ratio as in said scrap, to said slip mill to constitute at least 25%, by weight, of the total charge for said slip mill, and milling said total charge with said excess of solvent in said slip mill to form said slip.

2. A method of reconstituting unfired, cast, alumina scrap as described in claim 1, wherein said milling a charge of said scrap with an excess of solvent for said binder comprises milling for between 5 and 15 minutes.

3. A method of reconstituting unfired, cast, alumina scrap as described in claim 1, wherein said binder is polyvinyl butyral, said solvent is trichlorethylene, and said solvent is present in a quantity of 1 cc. trichlorethylene to 2.94 g. of total charge to provide a slip with said total charge of a viscosity between 20,000 and 35,000 centipoises at a temperature of between 68° F. and 76° F.

4. A method of reconstituting unfired, cast, alumina scrap as described in claim 1, wherein said scrap comprises, in addition, inorganic additives, and a plasticizer, said milling a charge of said scrap in said slip mill is with a solution of said solvent and a quantity of plasticizer sufficient only for said additional charge, said additional charge comprises only virgin powder components, and said milling a charge of said scrap is for a period of between 5 and 15 minutes in an ambient temperature of between 68° F. and 76° F.

5. A method of reconstituting unfired, cast, alumina scrap as described in claim 4, wherein said plasticizer is dibutyl phthalate and is present in said solution in a quantity of 1 cc. for each 138 g. of said additional charge of virgin powder components, and said milling of said total charge is for 2 to 6 hours in an ambient temperature of between 68° F. and 76° F.

6. In a method of reconstituting unfired, cast, alumina scrap, comprising components of aluminum oxide, inorganic additives, and a binder, into a slip suitable for recasting, wherein said scrap comprises a charge of up to 75% of the weight of a total charge for a slip mill, the remainder of said total charge comprising an additional virgin charge including substantially the same chemical components as in said scrap, and in the same ratio as in said scrap, the improvement comprising:

milling a charge of said scrap in a slip mill with an excess of a solvent necessary to dissolve said binder in said total charge, until said binder in said scrap dissolves and said scrap is broken down into its components, adding said additional virgin charge to the contents of said slip mill to provide said total charge in said slip mill, and milling said total charge with said excess of solvent in said slip mill to form said slip.

7. In a method of reconstituting unfired, cast, alumina scrap as described in claim 6, wherein said scrap also comprises a plasticizer, said inorganic additives comprise silicon dioxide, magnesium carbonate, and calcium carbonate, said binder comprises polyvinyl butyral, said additional virgin charge comprises only virgin powder components, and said scrap is milled in a solution of said solvent and liquid plasticizer, said liquid plasticizer being present originally in said solution in a quantity sufficient only for said additional charge, said additional virgin charge being added after said binder in said scrap has been dissolved.

8. In a method of reconstituting unfired, cast, alumina scrap as described in claim 7, wherein said alumina oxide comprises at least 75% of the weight of said scrap, and said solvent and said liquid plasticizer are present in said slip mill in a quantity to provide a slip of said total charge with a viscosity of between 20,000 and 35,000 centipoises, at a temperature of between 68° F. and 76° F., when said scrap has been broken down into its components and said additional virgin charge has been added to said slip mill and milled.

9. In a method of reconstituting unfired, cast, alumina scrap as described in claim 7, wherein said scrap comprises, by weight, 76.9% aluminum oxide, 7.7% silicon dioxide, 8.1% magnesium carbonate, 3.6% calcium carbonate, 3.7% polyvinyl butyral, and 1 cc. of dibutyl phthalate for each 138 g. of the solid material of said scrap, said solvent comprises trichlorethylene in a ratio of 1 cc. for each 2.94 g. of said total charge, and said liquid plasticizer comprises dibutyl phthalate in a ratio of 1 cc. for each 138 g. of said additional virgin charge.

10. In a method of reconstituting unfired, cast, alumina scrap as described in claim 6, wherein said milling is carried out in a slip ball mill at an ambient temperature of between 68° F. and 76° F.

11. In a method of reconstituting unfired, cast, alumina scrap as described in claim 6, wherein said total charge is milled in a slip ball mill for 2 to 6 hours.

References Cited
UNITED STATES PATENTS 2,966,719   1/1961   Park, Jr. _____ 106—39

SAMUEL H. BLECH, Primary Examiner

U.S. Cl. X.R.

106—39 R, 46, 65; 260—41 B; 264—37; 252—63.2, 63.5